Aug. 21, 1923.

J. ALLEMAN 1,465,460

MACHINE FOR CUTTING KEYWAYS

Filed Jan. 18, 1921

WITNESSES
H. T. Walker
P. H. Pattison

INVENTOR
JOHN ALLEMAN
BY
ATTORNEYS

Patented Aug. 21, 1923.

1,465,460

UNITED STATES PATENT OFFICE.

JOHN ALLEMAN, OF PHILADELPHIA, PENNSYLVANIA, ASSIGNOR TO AUGUST AMSLER, OF PHILADELPHIA, PENNSYLVANIA.

MACHINE FOR CUTTING KEYWAYS.

Application filed January 18, 1921. Serial No. 438,229.

*To all whom it may concern:*

Be it known that I, JOHN ALLEMAN, a citizen of the United States, and a resident of Philadelphia, in the county of Philadelphia and State of Pennsylvania, have invented a new and Improved Machine for Cutting Keyways, of which the following is a full, clear, and exact description.

The present invention relates to new and useful improvements in machine tools and it pertains more particularly to finishing tools.

It is the primary object of the present invention to provide a tool adapted to be attached to a lathe bed whereby such operations as key-way cutting and shaping may be carried out by hand.

It is a further object of the invention to provide a combination tool by means of which certain parts thereof may be replaced by other parts to provide a power-operated grinding tool It is a further object of the invention to provide a device of this character which may be readily attached to and detached from the bed of a lathe.

Figure 1:
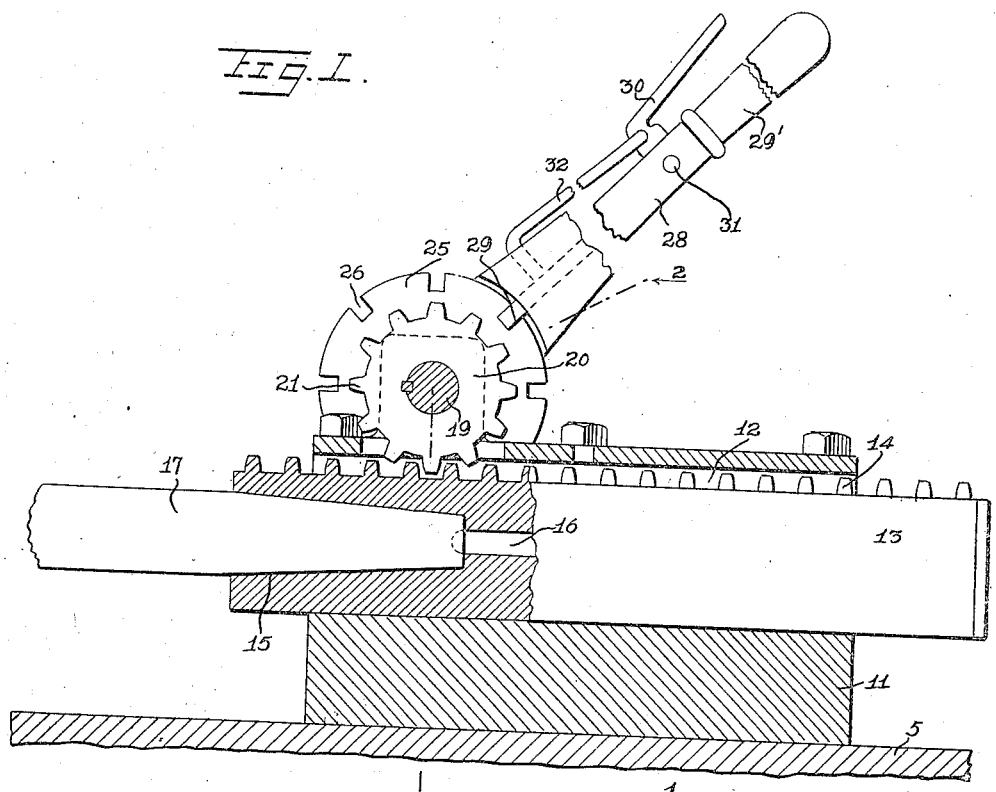
Figure 2:
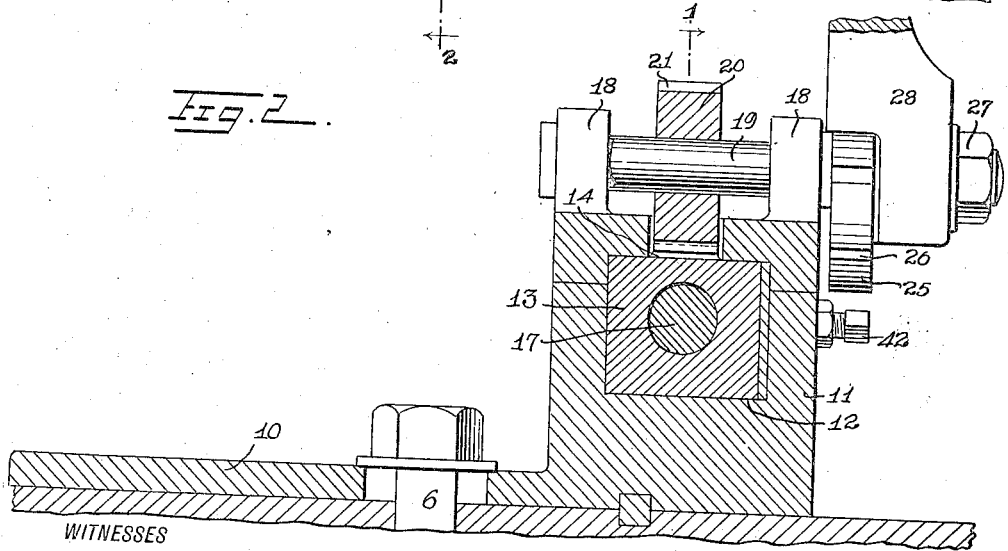

With the above and other objects in view, reference is had to the accompanying drawings, in which Figure 1 is a sectional view of the device as attached to a lathe, said sectional view being taken on the line 1—1 of Fig. 2;

Fig. 2 is a transverse sectional view taken at right angles to Fig. 1, and on the line 2—2 of Fig. 1.

Referring more particularly to the drawings, the reference character 5 designates a lathe bed and said lathe bed is provided with securing bolts 6 in the ordinary manner.

A device constructed in accordance with the present invention comprises a base 10 and upon one edge of said base there is a right-angular block 11 extending throughout the width thereof. This right-angular block 11 is provided with a cut-out portion 12, and said cut-out portion 12 extends entirely through the block from end to end. Mounted within the cut-out portion 12, is a reciprocating bar or the like 13, and said bar 13 is provided upon its upper face with a plurality of rack teeth 14. The bar 13 has one of its ends provided with a tapered recess 15, and leading into said tapered recess 15 from the other end of the bar, is a passage 16, which passage permits of the insertion of a suitable tool for engagement with the rear end of a cutting tool 17 to remove the same from the tapered recess 15. Projecting from the upper face of the block 11, near one of its ends, are two spaced ears 18, said ears being formed integral with the top face of the block, and mounted in said ears for rotation therein, is a shaft 19. Carried by the shaft 19 and rotatably mounted therewith, is a gear 20, the teeth 21 of which are adapted to engage the teeth of the rack 14 to provide the means by which the bar 13 may be reciprocated in the cut-out portion 12 of the block 11.

To provide for rotating the gear 20, a notched disk 25 is carried by the shaft 19, said disk 25 having notches 26. Pivotally mounted on the shaft 19 and secured thereto by means of a nut 27, is an operating lever 28, and said operating lever 28 has a sliding dog or pawl 29 adapted to be received within the notches 26 of the notched disk 25 in order that the notched disk 25 may be rotated. The operating lever 28 is provided with a hand grip 29', and pivotally mounted as at 31, on said lever, is a trigger 30. Connected to the trigger 30 and the sliding dog or pawl 29, is a link 32, by means of which the sliding dog or pawl 29 is engaged with and disengaged from the notches 26 in the disk 25.

The operation of this form of the invention is as follows:

The tool 17 (preferably a keyway-slot-cutting tool) is inserted in the socket 15, it being understood that the work to be operated upon is carried by the headstock of a lathe (not shown.) After the work and tool have been properly positioned with respect to each other, the hand grip 29' of the operating lever 28 is grasped and the trigger 30 is actuated to engage the pawl or dog 29 with one of the notches 26. Upon pressure being applied to the operating lever 28, the gear 20 is rotated and through the medium of its teeth 21 engages with the teeth 14 of the rack bar 13, it will be seen that the rack bar 13 will be reciprocated longitudinally of the cut-portion 12 of the block 11, thus causing a reciprocation of the tool relative to the work to carry out the operation desired.

I claim:

A device of the character described comprising a base having an enlarged portion formed on one end thereof, a passageway formed in said enlarged portion and extending therethrough, the upper wall of said passageway being formed with a cut-out portion, a tool holder slidably mounted in said passageway, a rack formed on the upper face of said tool holder and adapted to operate in said cut-out portion, a plurality of bearings formed on the top face of the enlarged portion of said base and adjacent said cut-out portion, a shaft rotatably mounted in said bearings, a gear wheel carried by said shaft and projecting through the cut-out portion in the top of the enlarged portion of the base and into engagement with the rack formed on the tool holder, and means comprising a ratchet mechanism secured to said shaft and adapted to operate the gear to move the tool holder longitudinally of the opening in the enlarged portion of the base.

JOHN ALLEMAN.